Dec. 26, 1967 M. B. SMITH 3,360,161
SPLASHPROOF DRINKING VESSEL
Filed Oct. 21, 1965
2 Sheets-Sheet 1

INVENTOR.
MARLIN B. SMITH
BY Ernest Carl Edge

Dec. 26, 1967     M. B. SMITH     3,360,161

SPLASHPROOF DRINKING VESSEL

Filed Oct. 21, 1965     2 Sheets-Sheet 2

INVENTOR.
MARLIN B. SMITH
BY Earnest Carl Edge

United States Patent Office 3,360,161
Patented Dec. 26, 1967

3,360,161
SPLASHPROOF DRINKING VESSEL
Marlin B. Smith, 743 Washington,
Cumberland, Md. 21502
Filed Oct. 21, 1965, Ser. No. 499,730
1 Claim. (Cl. 220—90.4)

This invention relates in general to a drinking vessel and in more particularity to a drinking vessel which is splashproof when subjected to movement.

It is the primary object of my invention to provide a drinking vessel which will permit a person to drink therefrom and which is so constructed that the contents thereof will not splash or spill out of the vessel when the vessel is moved.

It is a further object of my invention to provide a means for making a drinking vessel splashproof wherein such means does not have to be removed or adjusted when one wishes to drink from the vessel.

It is a further object of the invention to provide a splashproof drinking vessel which may be used by invalids, infants, and others who are unsteady in their hand movements and which will permit such infirm persons to drink without spilling the contents of the vessel.

A still further object of the invention is to provide a splashproof drinking vessel which may be easily cleaned and sanitized so as to prevent the transfer of harmful germs from one user to the next.

It is a still further object of my invention to provide a modification thereof which may be used with existing drinking vessels so as to make them splashproof without altering the present construction of the vessel.

A still further object of the invention is to provide a splashproof drinking vessel which is sturdy in construction, light in weight, economical in price, and relatively simple to manufacture.

Further objects, features, and advantages will either be specifically pointed out or become apparent when, for a better understanding of the invention, reference is made to the following written description taken in conjunction with the accompanying drawings, in which.

Throughout this specification the drinking vessel is referred to as a glass; however, those skilled in the art will realize it may be a cup or any other such drinking vessel and still fall within the spirit and scope of my invention.

Figure 1:
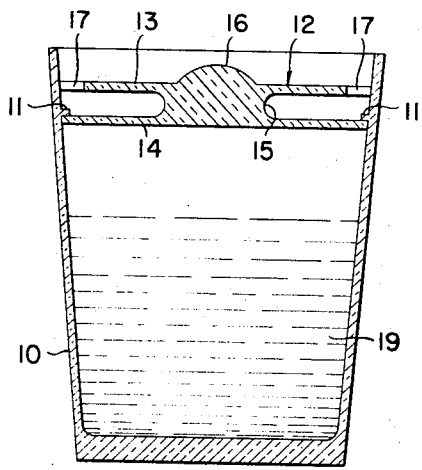
FIGURE 1 is a cross-sectional view of a drinking vessel with a splash-preventing baffle therein taken substantially on the lines 1—1 of FIGURE 2.
Figure 2:
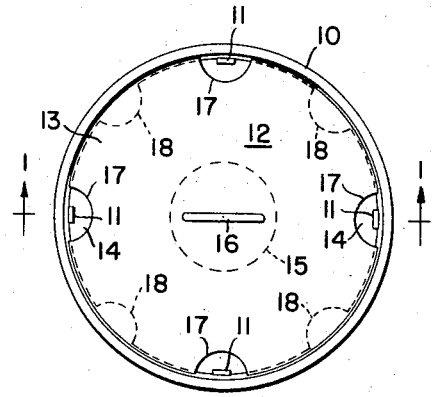
FIGURE 2 is a top plan view of the drinking vessel shown in FIGURE 1.

Referring now to FIGURES 1 and 2, glass 10 is shown as having a plurality of small projections 11 on the inside near the top thereof. For purposes of illustration four evenly spaced projections 11 are shown.

Fitting into the top of glass 10 is baffle 12 which is comprised of a top disc-shaped member 13 and a bottom disc-shaped member 14 held in a spaced apart relationship by spacer 15.

Extending upwardly from disc 13 is finger grip 16 which is a substantially flat vertical member.

Located at various positions around the perimeter of disc 13 are openings 17, shown here as four in number.

Located at various positions around the perimeter of disc 14 are openings 18, shown here as four in number. It will be noted that openings 17 are offset from and non-aligned with openings 18, the purpose of which will be pointed out below.

As glass 10 has inwardly sloping sides, disc 14 is shown as being of a smaller diameter than disc 13 in order to provide a better fit between these members and the sides of the glass.

Operation of this modification of my invention is as follows: when baffle 12 is out of the glass a person would grasp finger grip 16 and insert baffle 12 into the top of the glass. As projections 11 extend into the inside of the glass the baffle 12 is turned so that openings 18 will fit over the projections thereby permitting disc 14 to be placed below projections 11. Once in this position the finger grip 16 may be turned 45 degrees either clockwise or counterclockwise so that disc 14 rides underneath projections 11. In this position the decreasing diameter of glass 10 and the projections 11 hold disc 14 firmly in place.

When it is desired to drink from the glass it is put to the mouth and tilted with the lips aligned with one of the openings 17. The liquid 19 will travel up through openings 18 and then in a substantially horizontal path between discs 13 and 14 until it finds opening 17 through which it exits into the mouth.

If the glass 10 is held in an upright position such as shown in FIGURE 1 and given a sudden jerk, some of the liquid 19 may travel up through openings 18 but due to the fact that openings 17 are not in direct alignment with openings 18 the liquid will not leave the glass but will travel around between the disc-like members 13 and 14 then flow back through openings 18 into the glass 10. Thus liquids in glasses utilizing my invention may be transported from place to place without the necessity of having lids on them and still not permit the liquid to splash out of the glass.

Figure 3:
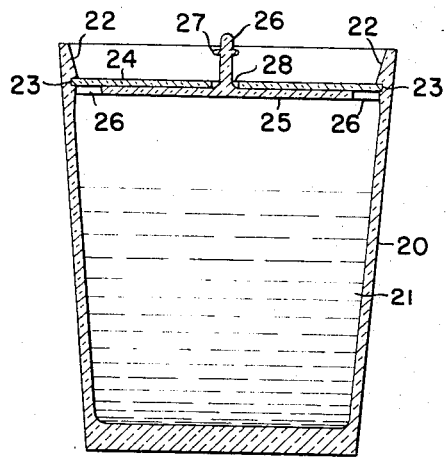
FIGURE 3 is a cross-sectional view of a modification of my invention in which the outlets are completely closed off.
Figure 4:
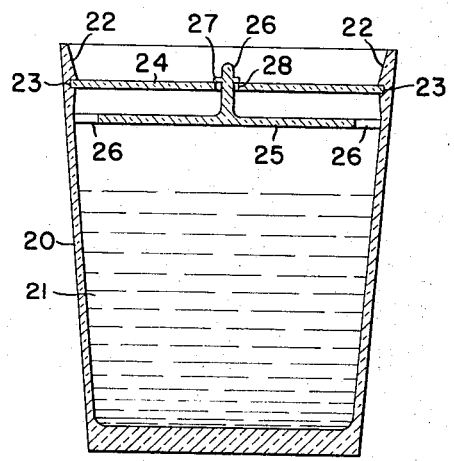
FIGURE 4 is a view of the modification shown in FIGURE 3 with the splashproof baffles in an open or drinking position.

In the modification shown in FIGURES 3 and 4 glass 20 has an annular projection 22 on the inside near the top thereof. In said projection 22 is an annular groove 23 into which disc 24 fits. Below disc 24 is disc 25 which has a vertical pin member 26 extending up through opening 28 in disc 24.

Pin 26 has an annular ring 27 around it near the top thereof to prevent the separation of the two discs 24 and 25.

Disc 24 has openings such as openings 17 of disc 13 spaced around the perimeter thereof and disc 25 has openings 26 spaced around the perimeter thereof with the openings in discs 24 and 25 being non-aligned.

Operation of this modification of the invention is as follows: when baffles 24 and 25 are out of glass 20 they may be inserted into the top of the glass and pushed downwardly until baffle 24 snaps into groove 23 of annular projection 22. Disc 25 is of smaller diameter and will snugly fit against the inside of the glass directly below groove 23.

With discs 24 and 25 together as in FIGURE 3 they act as a lid with no opening to the atmosphere since the openings in baffle 24 are not in alignment with the openings 26.

If pin 27 is pushed down so that ring 27 contacts the top of baffles 24 the two baffles are then spaced apart as in FIGURE 4. To drink the liquid 21 from glass 20 the glass would be lifted to the mouth with the lips near one of the several openings in disc 24. The liquid would flow through openings 26, then substantially horizontally between discs 24 and 25, and out through the opening in the disc 24.

To close off the openings, pin 26 may be grasped and disc 25 pulled up against disc 24 with friction between the perimeter of disc 25 and the inside of glass 21 holding it in place.

Figure 5:
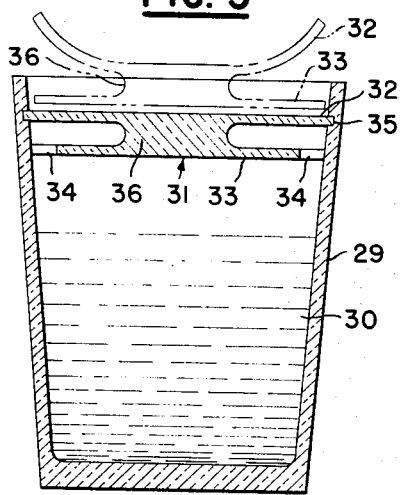
FIGURE 5 is a cross-sectional view of a further modification of my invention.

In the modification shown in FIGURE 5 a two layered baffle 31 is shown in glass 29 containing liquid 30. Glass 29 is provided with an annular groove 35 spaced down from the top and on the inside of the glass.

Baffle 31 is comprised of top disc-shaped member 32 and bottom disc-shaped member 33 joined and held apart by spacer 36. Disc 33 has a plurality of openings 34 spaced around the perimeter thereof; disc 32 also has a plurality of openings spaced around the perimeter thereof which are not in alignment with the openings 34.

As baffle 31 is made of a relatively flexible material, to insert it into the glass 29 the disc-shaped member 32 may be bent upwardly as shown in dotted line in this figure and pushed downwardly until disc 32 fits into annular groove 35.

The drinking operation from a glass with this modification of the baffle therein is substantially the same as the previously described modifications.

Figure 6:
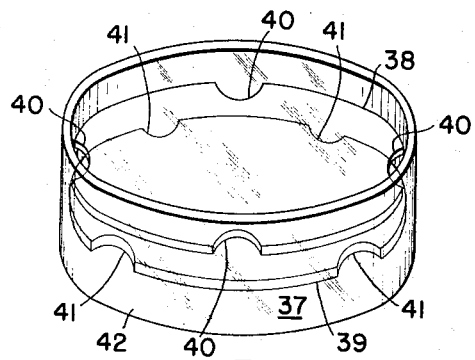
FIGURE 6 is a perspective view of a modification of the invention which may be used with existing drinking vessels.

FIGURE 6 illustrates an embodiment of my invention which may be used to convert glasses presently in existence to splashproof glasses. Converter 37 is comprised of a cylindrical member 42 which has two parallel discs 38 and 39 on the inside thereof with the discs 38 and 39 spaced apart in a vertical direction.

Disc 38 has a plurality of openings 40 and disc 39 has a plurality of openings 41. As shown in this figure the openings are not in vertical alignment but spaced apart from each other in accordance with the inventive principles of the previously described embodiments.

Converter 37 may be used on the inside of the glass, it may slip over the outside of the glass, it may be screw-threadedly engaged with the top of the glass, or may be attached to the glass in any manner desired. It is contemplated that the converter would be made in various sizes to conform to the most popular sizes of glasses in use today.

Figure 7:
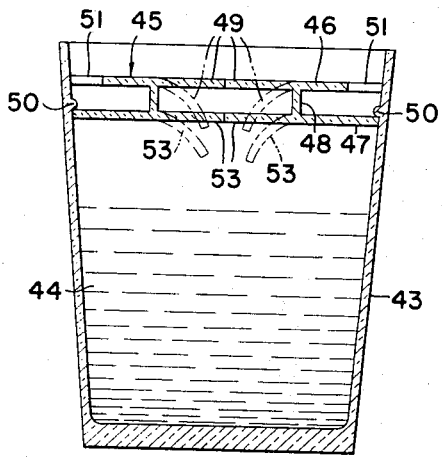
FIGURE 7 is a cross-sectional view of a still further modification of the invention.
Figure 8:
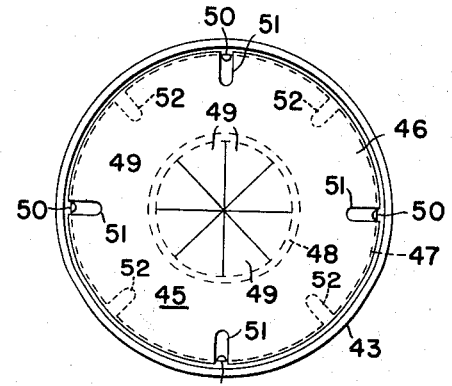
FIGURE 8 is a top plan view of the modification shown in FIGURE 7.

FIGURES 7 and 8 illustrate a modification which provides means for the insertion of items such as ice, drinking straws, etc., into the glass without the necessity of removing the baffle from the glass.

Glass 43 containing liquid 44 is shown as having a plurality of projections 50 spaced around the inside surface thereof near the top. For illustrative purposes four projections 50 are shown.

Baffle 45 is comprised of top member 46 and bottom member 47 spaced apart and held apart by spacer 48. Member 46 has a plurality of openings 51 spaced around the perimeter and member 47 has a plurality of openings 52 spaced out of alignment with openings 51.

In the center of member 46 is a plurality of slits which form a plurality of lips or flaps 49. In the center of member 47 is a plurality of slits which form a plurality of lips or flaps 53. As the entire baffle 45 is made of flexible material, when pressure is applied to the lips 49 and 53 they will move downwardly as shown in dotted line in FIGURE 7 to permit the insertion of ice cubes or such into the liquid 44. The lips 49 and 53 are to be made of a material which will return to its previous position once the force is removed.

Insertion and operation of the baffle of this modification as a splashproofing device is substantially the same as the modification shown in FIGURES 1 and 2 and described in detail above.

Figure 9:
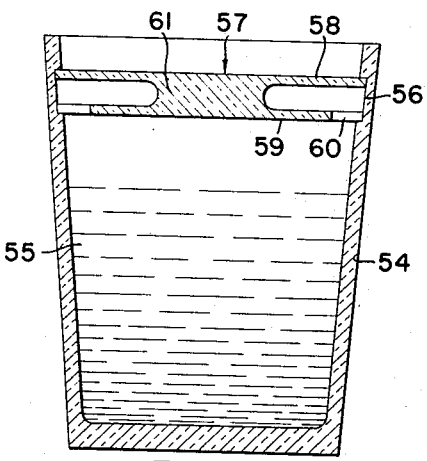
FIGURE 9 is a cross-sectional view of another modification.

FIGURE 9 illustrates still another means for holding the baffle within the glass. Glass 54 containing liquid 55 is shown as having an annular groove 56 around the inside near the top thereof. Baffle 57 fits into this groove with disc 58 fitting into the top portion of groove 56 and disc 59 fitting into the lower portion of the groove.

Spacer 1 keeps the two discs separated and spaced relative to each other so that the holes in disc 58 and the holes 60 in disc 59 are not aligned.

Baffle 57 is also made of a flexible material and is inserted by bending the outer edges of discs 58 and 59 upwardly as it is pushed into place.

Although several embodiments of my invention have been shown, it is understood that it is not intended to be exhaustive nor limiting of the invention, but on the contrary, is given for purposes of illustration in order that others skilled in the art may fully understand the invention and the principles thereof, and the manner of applying it in practical use so that they may modify and adapt it in various forms, each as may be best suited to the conditions of a particular use, and still be within the scope of my invention.

For example, the number of openings, the shape of the openings, and the spacing of the openings in the baffles may be changed. It is within the realm of my invention to have only a single hole in each disc-shaped member with the two holes nonaligned. An embodiment with a single hole in each disc would be especially useful as a training cup for children.

Likewise, the number of discs forming the baffle may be changed, the shape of the discs may be changed, handles may be provided for inserting and removing the baffles, etc., without departing from the scope and spirit of my invention.

From the foregoing disclosure it will be recognized that the invention is susceptible of modification without departing from the spirit and scope thereof, and it is to be understood that some of the details may be modified or omitted without departing from the spirit of the invention as defined by the following claim.

What is claimed is:

A converter for a drinking vessel comprising
(a) a plurality of spaced apart layers,
(b) a common vertical member enclosing the perimeter of each of said layers,
(c) said vertical member holding the layers in a spaced apart relationship,
(d) said space between said layers extending for more than one-half the area of the surface of each layer,
(e) a plurality of openings in the periphery of the lowermost layer,
(f) said openings providing access from the inside of a vessel in which the converter is used to the space between the layers,
(g) a plurality of openings in the periphery of the uppermost layer,
(h) said openings providing access from the space between the layers to the atmosphere,
(i) said openings in said uppermost layer being offset vertically from said openings in said lowermost layer so as to provide a circuitous path for any fluid travelling upwardly through said converter.

(References on following page)

References Cited

UNITED STATES PATENTS

| | | | |
|---|---|---|---|
| 562,440 | 6/1896 | Vandersall | 220—90.2 |
| 1,820,817 | 8/1931 | McRae | 222—564 |
| 2,242,966 | 5/1941 | Burkardt | 220—44 |
| 2,415,613 | 2/1947 | Sulak | 220—44 |
| 2,529,114 | 11/1950 | Tellier | 220—90.4 |
| 2,623,368 | 12/1952 | Olsen | 220—90.4 |
| 2,761,301 | 9/1956 | Tellier | 220—90.4 |
| 2,867,359 | 1/1959 | Adams | 222—547 |
| 2,937,223 | 5/1960 | Thompson | 215—56 |
| 3,143,257 | 8/1964 | Mumford | 222—564 |

FOREIGN PATENTS

| | | |
|---|---|---|
| 355,279 | 8/1931 | Great Britain. |

THERON E. CONDON, *Primary Examiner.*

RAPHAEL H. SCHWARTZ, *Examiner.*